May 31, 1960  W. D. TEAGUE, JR., ET AL  2,939,017
AIR DRIVEN POWER SUPPLY
Filed July 14, 1949  4 Sheets-Sheet 1
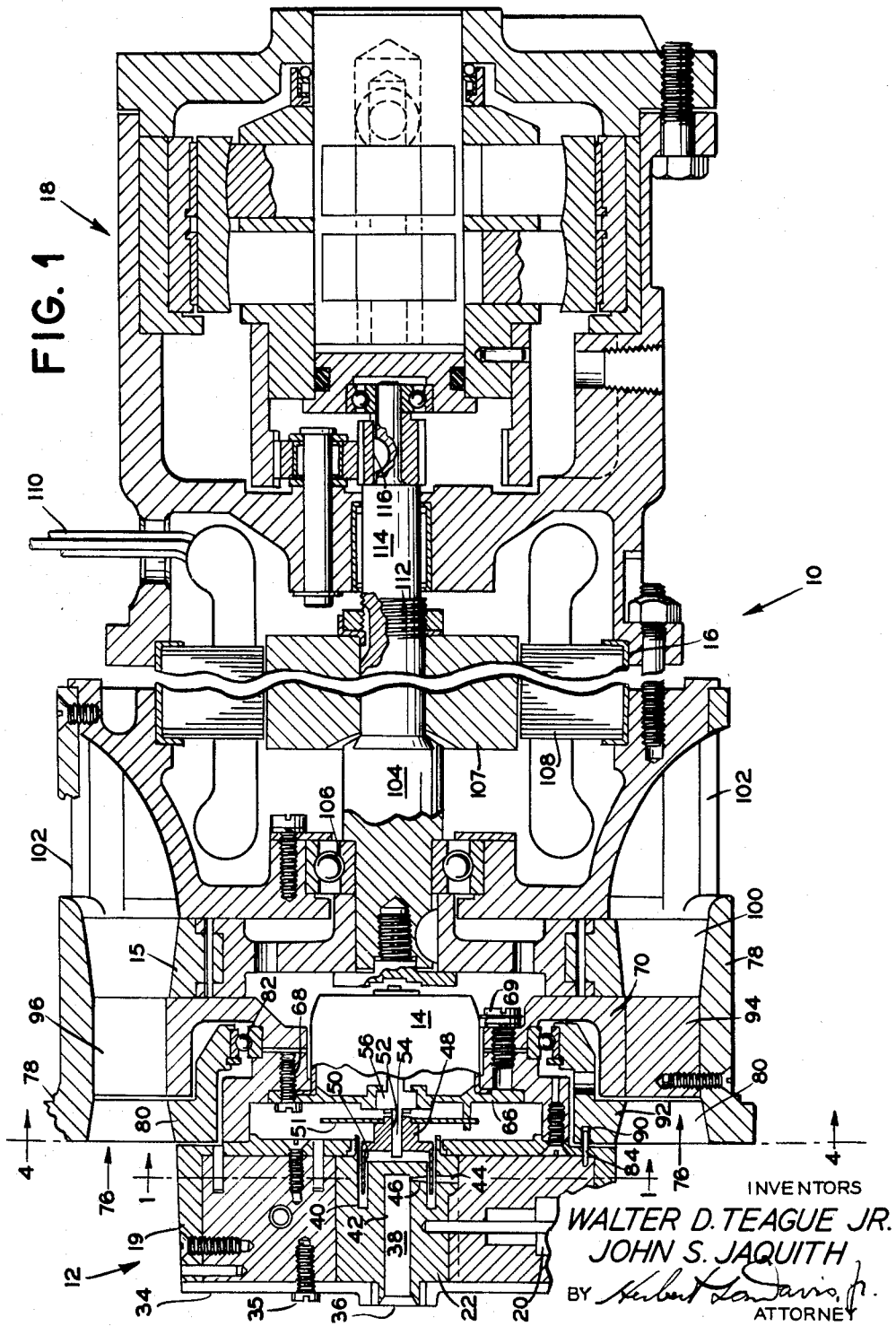
INVENTORS
WALTER D. TEAGUE JR.
JOHN S. JAQUITH
BY
ATTORNEY

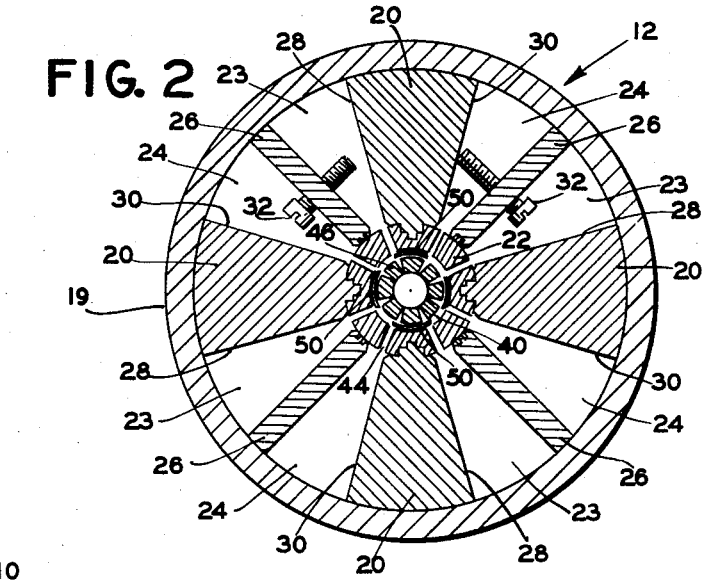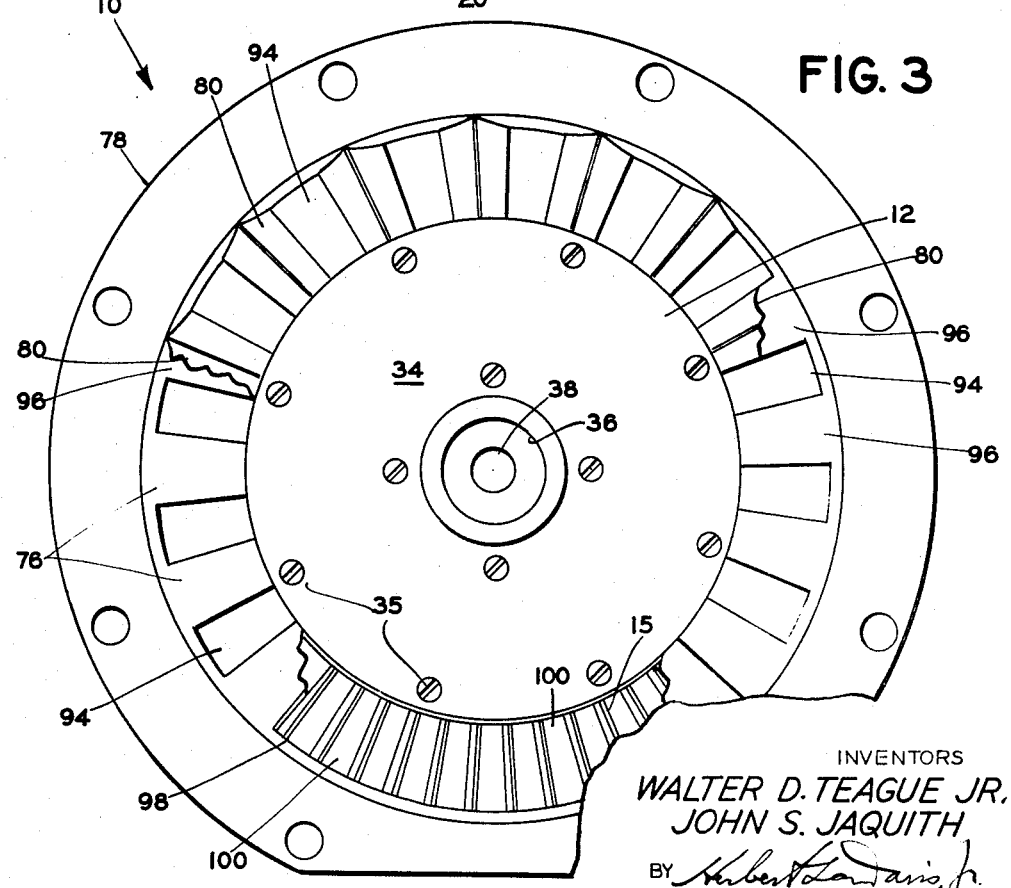

May 31, 1960  W. D. TEAGUE, JR., ET AL  2,939,017
AIR DRIVEN POWER SUPPLY

Filed July 14, 1949  4 Sheets-Sheet 3

INVENTORS
WALTER D. TEAGUE JR.
JOHN S. JAQUITH

BY *Herbert L. Davis, Jr.*
ATTORNEY

May 31, 1960  W. D. TEAGUE, JR., ET AL  2,939,017
AIR DRIVEN POWER SUPPLY

Filed July 14, 1949  4 Sheets-Sheet 4

INVENTORS
WALTER D. TEAGUE JR.
JOHN S. JAQUITH
BY
ATTORNEY

United States Patent Office 2,939,017
Patented May 31, 1960

2,939,017
AIR DRIVEN POWER SUPPLY

Walter D. Teague, Jr., Alpine, and John S. Jaquith, Caldwell, N.J., assignors to Bendix Aviation Corporation, Teterboro, N.J., a corporation of Delaware Filed July 14, 1949, Ser. No. 104,714

16 Claims. (Cl. 290—44)

The present invention relates to means for supplying a continuous source of hydraulic and electrical power to an aircraft where a source of ram air is available.

The invention finds particular utility in applications to missiles or ram jets where once the craft is launched, it is desired to provide a constant and positive and self-sustaining source from which to draw the electrical and hydraulic power required to operate the various accessories on the craft, such as valves, servos, switches, lights, relays, boosters and the like. This object has heretofore been accomplished by the separate installation of batteries and engine driven pumps and a multitude of hydraulic accumulators which because of their relatively greater weight penalized the craft accordingly.

It is, therefore, one of the objects of the present invention to provide a source of electrical and hydraulic energy for an aircraft wherein the foregoing disadvantages are eliminated, and to do so by novel and effective means.

Another object of the invention is to provide a source of electrical and hydraulic power for an aircraft by the employment of ram air driven means.

Still another object of the invention is to provide a compact unit relatively light in weight and easy to install on an aircraft which will continuously and dependably fulfill the electrical and hydraulic requirements of the craft.

Still another object of the invention is to provide means of the above-indicated nature which will be simple and economical to manufacture, and yet positive and reliable in operation.

The foregoing and other objects and advantages will appear more fully hereinafter from a consideration of the detailed description which follows, taken together with the accompanying drawings wherein one embodiment of the invention is illustrated by way of example. It is to be expressly understood, however, that the drawings are for the purpose of illustration only and are not to be construed as defining the limits of the invention, reference being had for this purpose to the appended claims.

Referring to the drawings, wherein like reference characters designate like parts, Fig. 1 is a side view partly in section of the device.

Fig. 2 is a sectional view of the air servo taken along line 1—1 of Fig. 1.

Fig. 3 is a frontal view of the complete device.

Figure 4:
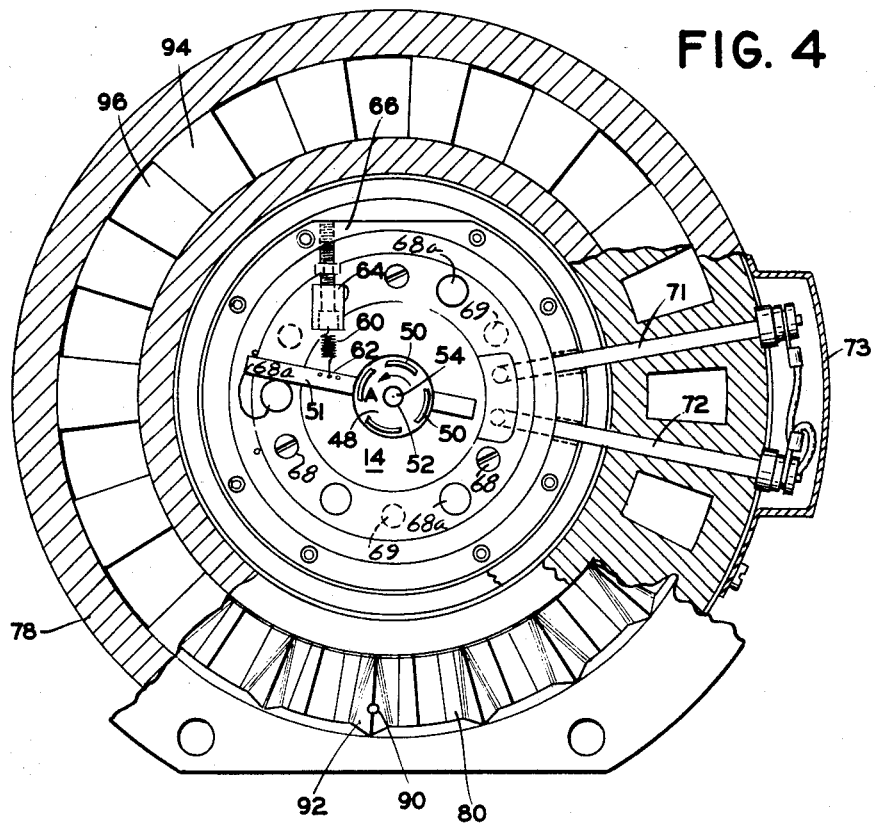
Fig. 4 is a view taken along the line 4—4 of Fig. 1.
Figure 6:
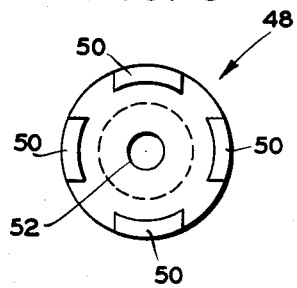
Fig. 6 is an end view of the positioning control vane.

Referring now to the drawings and more particularly to Fig. 1, the ram air driven power supply, generally indicated by the numeral 10 comprises from left to right, an air servo 12 responsive to a torque motor 14, a turbine wheel 15 and an alternator 16 keyed to a hydraulic pump 18.

An annular casing 19 on the air servo 12 encloses a bank of rotatable pistons 20 (Fig. 2) radially disposed about the hub 22 and having limited freedom to rotate thereabout. Air pressure chambers 23 and 24 are at opposite sides of each piston 20 and are contained between stationary partitions 26 and sides 28 and 30 respectively of the pistons, in alternate succession. A pair of adjustable screw stops 32 limit the angular movement of the piston bank 20 about the hub 22. The cover plate 34 for the casing 19, attached as by screws 35 (Fig. 3), contains a center hole 36, collinear with bore 38 in the center of the hub 22. An annular groove 40 in the hub 22 is concentrically disposed about the end portion 42 of the bore 38, and a radial passageway 44 connects each air pressure chamber 24 (Fig. 2) with the groove 40 in the end potrion 42 of the bore 38.

Figure 5:
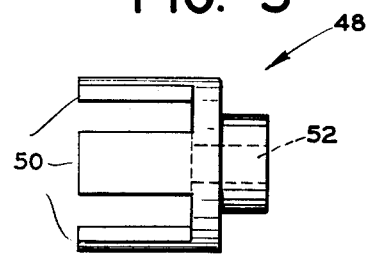
Fig. 5 is a side view of the positioning control vane.

A quadrifurcated cupped control vane 48 (Fig. 5) extends into the groove 40, and forks 50 thereon are spaced to cover alternate radially tapered nozzles 46 thereby interrupting communication of each of said nozzles with its respective collinear passageway 44.

In the present embodiment of the invention it has been elected to show a bank of four pistons 20, each flanked by separate pressure chambers 23 and 24, and one nozzle 46 and collinear passageway 44 leading thereto, although it will be apparent that a greater or lesser number of pistons, each flanked by a chamber communicated into by nozzle and passageway means may be employed to equal advantage.

A lever 51 is keyed to the back of the control vane 48, and a hole 52 through the lever 51 and vane 48 contains in press-fitted relation the shaft 54 extending from the forward bearing 56 of the torque motor 14 and driven by an armature of the motor, not shown.

A tension spring 60 (Fig. 4) attaches at 62 to one end of the lever 51 and to a turn buckle 64, adapted to adjust the tension in the spring 60, which in turn is secured to the supporting structure 66 of the torque motor 14, so that driven shaft 54 of the torque motor 14 operates the control vane 48 against the tension of the spring 60.

The torque motor 14 is mounted by the support 66 which in turn, by means of screws 68 and 69, attaches to the internal casing rib 70. Electric leads 71 and 72 of Fig. 4 join the motor 14 to a junction box 73 and thence through conduit 74 of Fig. 8 to a junction box 75 for the output of alternator 16, thus connecting the output of the alternator 16 to the motor 14 so that the torque of the motor 14 is a function of the alternator output.

Figure 7:
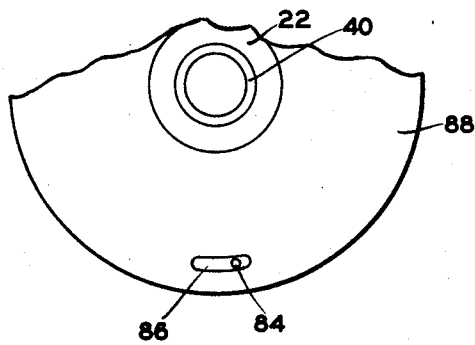
Fig. 7 is a view of a portion of the back of the air servo.

Referring again to Fig. 1, the unit 10 may be mounted on a missile or an aircraft so that an inlet 76 in the casing 78 is open to the slipstream or ram pressure and is subject to flow regulation by means of a rotary vaned throttle 80 which rotates on ball bearing 82. Drive pin 84 (Figs. 1 and 7) is staked into one of the cylinders of the rotating cylinder bank 20 and protrudes through a slot 86 (Fig. 7) in the rear plate 88 of the air servo 12 and presses into a hole 90 (Figs. 1 and 4) in a shoulder 92 of the throttle 80, so that the throttle is driven by the pin 84 within the limits of the slot 86, according to the rotative movement of the cylinder bank 20. A stationary nozzle block 94 is positioned directly behind the throttle 80 and comprises a series of nozzles 96 adapted to be fully or partially closed by the movement of the throttle 80.

Figure 8:
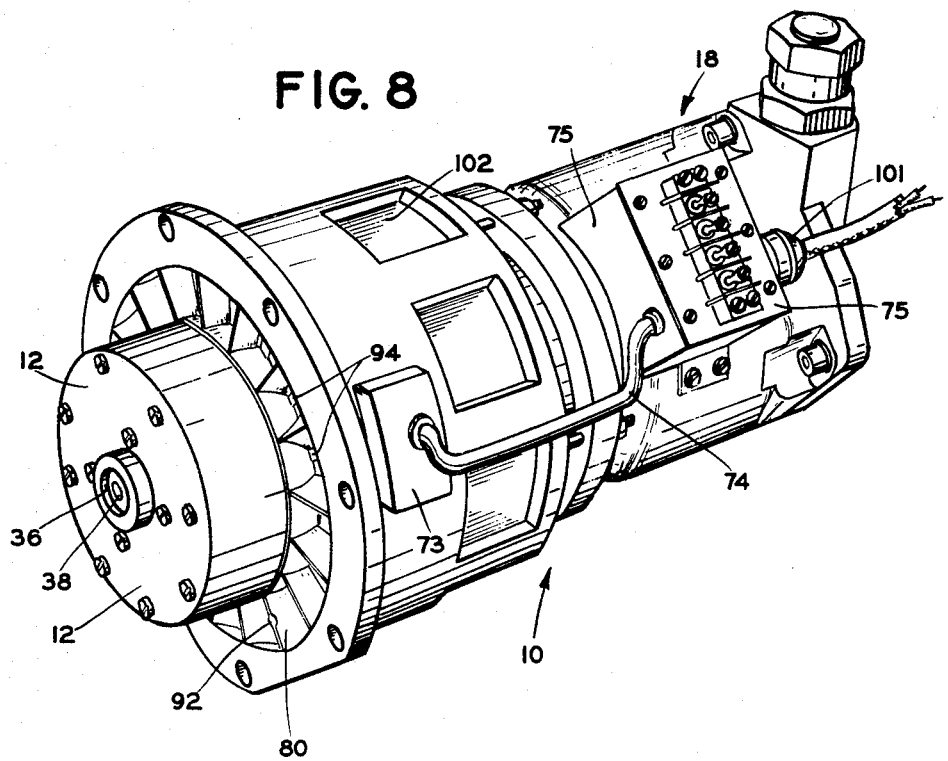
Fig. 8 is an isometric view of the complete device.

The turbine wheel 15 is directly behind the nozzle block 94 and buckets 100 of the turbine wheel 15 exhaust to atmosphere through the relatively large opening 102 (Figs. 1 and 8).

The turbine wheel 15 mounts on a continuous shaft 104 which rotates on bearing 106, and is the common shaft for alternator 16, having a rotor 107 connected to shaft 104 and rotatably mounted within a stator assembly 108. Leads 110 from the alternator 16 are connected to the junction box 75 which may be of a type well known in the art and from which the electrical output of the alternator 16 is distributed to the various electrical components on the craft and to the torque motor 14 as previously described. The right end of the common shaft 104 is keyed as at 112 to a shaft 114 of a conventional rotary pump 18. A planetary gear system generally indicated by the numeral 116 reduces the revolutions per minute of the shaft 114 to normal pump values.

Having thus described the invention, in operation it will now be apparent to those skilled in the art that when the unit 10 is installed in a missile or aircraft, and a blast of air is directed towards the air servo 12, the throttle 80 being open, ram air pressure will enter the inlet 76 into the nozzle block 94 and drive the turbine wheel 98, which in turn by means of common shaft 104 will drive the alternator 16 and the hydraulic pump 18.

The torque motor 14 is connected through junction boxes 74 and 75 to the alternator 16 and is energized by the output therefrom. The torque developed by the motor 14 is made proportional to the frequency of the alternator 16 over the desired control range by means of a control circuit, connected to the device by plug 101, which derives its power from the alternator output and is a direct function of the speed of the turbine wheel. The torque of the motor 14 is exerted in the direction A indicated by the arrow, counter-clockwise in Fig. 4 and operates through the lever 51, to extend the tension spring 60, and to turn the quadrifurcated cupped control vane 48, which is attached to the motor shaft 54.

Referring to Figs. 1 and 8, ram pressure simultaneously will enter the bore 38 in the air servo 12, through the inlet hole 36 and thence through the tapered radial nozzles 46 of Figs. 1 and 2. The counterclockwise movement of the control vane 48 will cause the forks 50 thereof to interrupt the flow of ram air from the alternate nozzles 46 to their respective passageways 44 which lead to the air chambers 23 formed on one side 28 of the piston bank 20 (Fig. 2) and open passageways 44 to chambers 24 to exert a force on side 30 of piston bank 20. Thus said pressure chambers 24 will become pressurized while the alternate pressure chambers 23 formed on one side of the pistons 20 will be cut off from their supply of ram air by the control vane 48 throttling the flow from their respective nozzles 46 to the collinear passageways 44 leading thereto. Thereupon the pressure acting on the sides 30 will cause the piston bank 20 to rotate about the hub 22 in a counterclockwise direction, and the drive pin 84 staked therein and pressed into hole 90 of the throttle 80, will drag the throttle in the same counterclockwise direction to shut off the ram air flow to the nozzle block 94. The pressure built up in the chambers 23 due to the rotation of the piston bank 20 is vented through their respective passages 44, the clearance between the forks 50 of the control vane 48 and the groove 40 in which they operate into the space in front of the torque motor 14. Passages 68a in the casing rib 70 (Fig. 4) place the space in front of the torque motor 14 in communication with the chamber in which the turbine 15 rotates. Therefore, the pressure aforesaid passes from the space in front of the torque motor 14, through the passages 68a into the operating chamber of the turbine 15 where it vents into the atmosphere through the clearance between the turbine 15 and the walls of the chamber in which the turbine 15 rotates and the opening 102.

By suitably shaping the jet nozzles 46 in accordance with the Laval nozzle principle, well known to the art, a substantial recovery of impact or ram pressure can be attained on the sides 30 of the piston bank 20. In other words, the ram air in the bore 38 has a high static pressure and a relatively low velocity. The nozzles 46 convert this air into a high velocity air stream having a relatively low static pressure, and directs the air stream into the passages 44. Upon leaving the passages 44 into the chambers 24, the air expands to the end that the velocity thereof decreases and its static pressure increases. Of course, when the ram air is directed to the chambers 23 by appropriate operation of the control vane 48 the pressure will be applied on the side walls 28 of the piston bank 20 to drive the piston bank 20 in an opposite direction. Thus sufficient torque will be available to force the throttle 80 and the piston bank 20 to follow closely the position of the control vane 48.

With the throttle 80 now in closed position, the speed of the turbine wheel 15 will be materially reduced thereby reducing the frequency or electrical output of the alternator 16. The torque motor 14 energized therefrom will consequently develop less torque, and the tension spring 60 acting on the lever 51 will overcome the reduced torque and cause the control vane 48 to be rotated in clockwise direction thereby now interrupting the alternate nozzles 46 and their respective passageways 44 leading to those chambers 24 formed in part by sides 30, and pressurizing the alternate chambers 23 formed in part by sides 28. The piston bank 20 will now be caused to rotate in the opposite or clockwise direction, and by means of the driving pin 84 will drag the throttle 80 in a clockwise direction to open the nozzle block 94 to the ram air inlet 76.

The forks 50 on the control vane 48 are of such width as to extend to the center line of each radially equi-spaced nozzle to the center line of the following nozzle, thereby in the balanced condition of the device impact ram air pressure is admitted equally to all of the pressure chambers 23 and 24, and the throttle 80 will then remain stationary. The throttle 80 thereafter opens inversely as the speed of the alternator 16 over the control range, which is identical to the speed of the turbine wheel 15.

The tension spring 80 is adjustable by means of a turnbuckle 64, and is set to tend to always keep the throttle 80 in fully open position. The sweep of the throttle may be adjusted by means of screw stops 32 which limit the rotative movement of the piston bank 20.

The hydraulic pump 18 is continuously driven by the common shaft 104 to supply a constant source of hydraulic power to the various hydraulic accessories on the craft.

There is thus provided a device including a ram air driven means for supplying a continuous source of electrical and hydraulic energy, especially applicable to a missile or jet aircraft, which obviate the necessity for heavy batteries, valves, accumulators and other allied equipment, and which device is simple and easy to install, economical to manufacture, and yet positive and reliable in operation.

Although only one embodiment and one application of the invention have been illustrated and described, other changes and modifications in the form and relative arrangement of parts, which will be apparent to those skilled in the art, may be made without departing from the spirit and scope of the invention.

What is claimed is:

1. A device for supplying electrical and hydraulic power, comprising a main casing containing a ram air inlet and a nozzle block, a rotating throttle adapted to close said nozzle block, an impulse wheel driven through said block, a main shaft mounting said wheel and driven thereby, an electrical generator and a hydraulic pump driven by said shaft, a torque motor mounted in said casing energized by said generator, a quadrifurcated cupped control vane and a lever mounted on said motor shaft, a tension spring attached to said lever and to said motor support to resist the turning of said motor shaft, a second casing mounted on said main casing, a ram air opening in said second casing, a hub including a bore coaxial with said opening, a plurality of equi-spaced radial partitions emanating from said hub, a piston rotatable about said hub between said partitions forming a pressure chamber therewith on both sides of said pistons, an annular concentric groove about said bore, a radial nozzle connecting said bore to said groove directed toward each of said chambers, a passageway collinear with said nozzle connecting said groove to said chamber each alternate passageway being closed from its respective collinear nozzle by said quadrifurcated control vane protruding within said groove, screw stop means through two of said partitions to adjust the rotative sweep of said cylinders, and a driving pin imbedded in one of said cylinders attached to said throttle adapted to therewith close said nozzle block to regulate the speed of said impulse wheel upon said torque motor overcoming said spring to turn said control vane to simultaneously interrupt ram air flow to each alternate pressure chamber thereby rotating said cylinder bank and said driving pin to rotate said throttle.

2. A hydraulic and electrical power supply for a missile or aircraft, comprising a casing including a ram air inlet, an impulse wheel driven by flow through said inlet, a rotatable throttle between said inlet and said impulse wheel to regulate the speed of said wheel, a shaft driving an electrical alternator and hydraulic pump and mounting said impulse wheel and driven thereby, a torque motor energized proportionally to the output of said alternator mounted within said casing, a detachable casing mounted to said first casing, a hub including a center bore open to ram pressure within said second casing, a plurality of fixed partitions extending radially from said hub, a bank of radial pistons having limited rotative movement about said hub and each piston being between two successive partitions, an air pressure chamber between each piston face and said fixed partitions, nozzle and passageway means connecting each of said chambers to ram air pressure, a driving pin rigidly connecting said piston bank to said throttle, a control vane attached to the shaft of said torque motor to interrupt ram air flow through said nozzle and passageway means simultaneously to alternate pressure chambers to rotate said piston bank and said throttle to govern the speed of said impulse wheel and thereby the output of said alternator and hydraulic pump, and a tension spring working against said motor shaft to normally position said control vane to interrupt flow simultaneously to said alternate pressure chambers to maintain said throttle in open position.

3. A hydro-electrical air driven power supply for an aircraft, comprising a casing including a ram air inlet, a rotary throttle regulating said inlet, an impulse wheel behind said throttle exhausing to atmosphere, a shaft mounting said wheel and driven thereby, a hydraulic pump and a generator driven by said shaft, a ram air responsive servo including a bank of rotary pistons mounted in said casing, a pressure chamber adjacent to both sides of said pistons, nozzle and passageway means admitting ram pressure to said chambers, a driving pin imbedded in said piston bank and attached to said throttle, a torque motor including a protruding shaft mounted in said casing and cooperating with said air servo, the torque of said motor being a function of the output of said generator, a control vane on said motor shaft protruding into said air servo to interrupt said nozzle and passageway means to alternate pressure chambers thereby rotating said piston bank and said pin, and said throttle to govern the speed of said impulse wheel and regulate the output of said pump and generator, and tension spring means disposed to resist the turning of said torque motor shaft thereby positioning said control vane to bias said piston bank towards open throttle position.

4. A ram air electro-hydraulic power supply for a missile or aircraft, comprising a hydraulic pump and an alternator, a driving shaft common to said pump and alternator, a ram air driven impulse wheel driving said shaft, a rotary throttle adapted to control flow of ram air to said impulse wheel, an air servo including a bank of rotary pistons attached to said throttle, a pressure chamber adjacent to each piston, nozzle and passageway means connecting said chambers to ram air, a torque motor responsive to a function of the output of said alternator cooperating with said air servo, and a control vane on said motor adapted to interrupt said nozzle and passageway means to said pressure chambers to cause said pistons to rotate thereby rotating said throttle to control the speed of said impulse wheel and thereby regulate the output of said alternator and hydraulic pump.

5. A power supply for a missile or an aircraft, comprising a generator, a shaft for said generator, a ram air driven turbine wheel driving said shaft, a rotary throttle adapted to govern ram air flow to said wheel, an air servo including a bank of rotary pistons, said pistons being attached to said throttle, nozzle and passageway means conducting ram pressure to rotate said pistons, a torque motor, the torque of said motor being a function of the output of said generator, a control vane on said motor adapted to interrupt said nozzle and passageway means to rotate said pistons and close said throttle upon an increase in generator output, and spring means resisting the torque of said motor tending to restore said throttle to open position.

6. A ram air driven power supply for a missile or aircraft, comprising a casing including a ram air inlet, a turbine wheel, a normally open throttle adapted to regulate ram air flow to said wheel, ram air exhaust ports to atmosphere in said casing behind said wheel, a generator driven by said wheel, a torque motor excited by the output of said generator, an air servo including a bank of rotary pistons attached to said casing, nozzle and passageway means conducting ram air pressure to said pistons, a driving pin attaching said piston bank to said throttle, a control vane on said torque motor cooperating with said air servo to regulate said nozzle and passageway means to direct ram air to rotate said pistons to close said throttle upon excessive excitation of said torque motor, and spring means resisting the torque of said motor thereby restoring said throttle to open position upon a decrease in excitation of said motor.

7. A power supply for a missile or an aircraft, comprising a generator, a shaft for said generator, a ram air driven turbine wheel driving said shaft, a rotary throttle adapted to govern ram air flow to said wheel, an air servo including a bank of rotary pistons, said pistons being attached to said throttle, nozzle and passageway means conducting ram pressure to rotate said pistons, and a torque motor, the torque of said motor being a function of the output of said generator cooperating with said servo to actuate said throttle upon a change in speed of said turbine wheel.

8. A ram air driven power supply for a missile or aircraft, comprising a generator, a ram air responsive turbine wheel driving said generator, an air servo including a bank of ram air responsive rotary pistons, a rotary throttle attached to said pistons adapted to regulate ram air flow to said turbine wheel, and a torque motor including a control vane adapted to throttle ram air flow to said pistons, the torque of said motor and the throttling action of said control vane changing in response to changes in the speed of said turbine wheels thereby actuating said throttle to regulate the speed of said wheel and thereby control the output of said generator.

9. A power supply for a missile or aircraft, comprising a generator, a ram air driven impulse wheel driving said generator, a thottle adapted to regulate the speed of said wheel, a ram air operated servo mechanically associated with and adapted to regulate said throttle, control means for said servo, and a torque motor excited by said generator and operative to actuate said control means, thereby cooperating with said servo to regulate said throttle and the output of said generator.

10. A ram air driven power supply for a missile or aircraft, comprising a generator, a turbine wheel driving said generator, and a throttle therefor, a rotary piston air servo attached to said throttle, a source of ram jet air for said servo, means for controlling the operation of said servo, and a torque motor excited as a function of the output of said generator and operatively connected to the control means for said servo, thereby cooperating with said air servo to govern said throttle and the speed of said turbine wheel to control said generator.

11. A ram air driven power supply for a missile or an aircraft, comprising a ram air driven turbine wheel and a throttle therefor, a generator driven by said wheel, a ram air servo connected to and actuating said throttle, and a motor developing a torque proportional to the speed of said turbine wheel connected to and controlling the actuation of said servo so as to regulate the speed of said wheel and thereby the output of said generator.

12. An air driven power supply comprising an air driven turbine wheel and a throttle therefor, a generator driven by said wheel, a ram air servo attached to said throttle for the operation thereof, and torque motor means connected to and controlling the actuation of said servo in response to the output of said generator to thereby regulate said throttle inversely proportionate to the speed of said turbine wheel.

13. An air servo for controlling the power supply for a missile or aircraft, wherein a ram air driven wheel regulated by a throttle drives a generator and a hydraulic pump, said air servo comprising a casing, a hub within said casing, a plurality of fixed partitions emanating radially from said hub, a rotatable radial piston between said partitions having limited movement therebetween and forming a pressure chamber therewith, an axial center bore in said hub, a cover plate for said casing having an opening concentric with said bore, an annular groove in said hub concentric about the base of said bore, a plurality of radial nozzles connecting said bore to said groove, an equal number of passageways collinear with said nozzles in said bore connecting said groove with said pressure chambers, and a driving pin imbedded in at least one of said pistons and attached to said throttle to rotate said throttle upon interrupting communication between alternate nozzles and their respective passageways to pressurize alternate pressure chambers to rotate said pistons and throttle and thereby govern by the speed of said turbine wheel the output of said generator and pump.

14. An air servo for controlling the power supply for a missile or aircraft, wherein a ram air driven turbine regulated by a rotatable throttle drives a generator, said air servo comprising a bank of radial pistons rotatable about a hub, an axial bore in said hub open to ram air, and nozzle and passageway means conducting ram air against said pistons, said pistons being connected to operate said throttle upon interruption of said nozzle and passageway means to govern said turbine and thereby the output of said power supply.

15. An air servo for controlling the power supply for a missile or aircraft, wherein an air driven turbine regulated by a throttle drives said power supply, said air servo comprising means providing an air inlet and a source of air pressure for said servo, a plurality of pressure chambers, nozzle and passageway means from said inlet to said chambers, a movable structure operatively connected to said throttle adjacent to said chambers, and control means for varying the air pressure applied through said nozzle and passageway means to said chambers to actuate said movable structure to move said throttle and thereby control said power supply.

16. An air servo for controlling the power supply for a missile or aircraft, wherein a ram air driven turbine regulated by a rotatable throttle drives a generator, said air servo comprising a bank of radial pistons rotatable about a hub, a fixed partition on both sides of said pistons forming a plurality of pressure chambers therewith, an axial bore in said hub open to ram air, and nozzle and passageway means conducting ram air to said pressure chambers, at least one of said pistons being adapted to operate said throttle upon the interruption of alternate nozzle and passageway means to govern the speed of said turbine and thereby the output of said generator.

References Cited in the file of this patent

UNITED STATES PATENTS

| 648,695 | Krone | May 1, 1900 |
| 1,312,021 | Dickenson et al. | Aug. 5, 1919 |
| 1,362,753 | Sperry | Dec. 21, 1920 |
| 1,369,672 | Koenig | Feb. 22, 1921 |
| 1,443,664 | Vischer | Jan. 30, 1923 |
| 1,884,043 | Martin | Oct. 25, 1932 |
| 2,011,859 | Kalin | Aug. 20, 1935 |
| 2,054,258 | Kinzie | Sept. 15, 1936 |
| 2,230,361 | Morin et al. | Feb. 4, 1941 |
| 2,481,222 | Jones | Sept. 6, 1949 |

FOREIGN PATENTS

| 554,906 | Germany | Nov. 2, 1932 |